(12) United States Patent
Xiong et al.

(10) Patent No.: US 9,516,550 B2
(45) Date of Patent: Dec. 6, 2016

(54) WIRELESS BROADBAND COMMUNICATION METHOD, DEVICE, AND SYSTEM TO ESTABLISH A BEARER BETWEEN A USER EQUIPMENT AND A SMALL CELL

(71) Applicant: Huawei Technologies Co., Ltd., Shenzhen (CN)

(72) Inventors: Xin Xiong, Beijing (CN); Yan Wang, Beijing (CN); Song Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 14/155,279

(22) Filed: Jan. 14, 2014

(65) Prior Publication Data

US 2014/0128092 A1    May 8, 2014

Related U.S. Application Data

(63) Continuation of application No. PCT/CN2012/077053, filed on Jun. 16, 2012.

(30) Foreign Application Priority Data

Jul. 15, 2011    (CN) .......................... 2011 1 0199326

(51) Int. Cl.
*H04W 36/00*    (2009.01)
*H04W 28/16*    (2009.01)
(Continued)

(52) U.S. Cl.
CPC ............. *H04W 28/16* (2013.01); *H04W 24/02* (2013.01); *H04W 76/041* (2013.01);
(Continued)

(58) Field of Classification Search
CPC ........... H04W 84/047; H04W 84/045; H04W 36/0055; H04W 92/20; H04W 16/32; H04W 36/0083; H04W 72/04; H04W 36/08; H04W 74/0833; H04W 76/02; H04W 36/0061; H04W 72/0406; H04W 72/0426; H04W 72/0446
USPC .............................. 455/436–44; 370/321–334
See application file for complete search history.

(56) References Cited

U.S. PATENT DOCUMENTS 5,553,069 A     9/1996 Ueno et al.
2008/0310378 A1* 12/2008 Kitazoe ................. H04W 76/02
                                                         370/338
(Continued)

FOREIGN PATENT DOCUMENTS

CN      101637036 A    1/2010
CN      101796857 A    8/2010
(Continued)

OTHER PUBLICATIONS

Aminaka et al (International Publication No. WO 2011/018,890 published on Feb. 17, 2011).*
(Continued)

*Primary Examiner* — Ronald Eisner
(74) *Attorney, Agent, or Firm* — Slater Matsil, LLP

(57) ABSTRACT

Embodiments of the present invention provide a wireless broadband communication method, device, and system, so as to increase bandwidth and capacity of mobile broadband communications and at the same time lower cost. The method provided in an embodiment of the present invention includes: establishing, by a macro base station, a Radio Resource Control RRC connection with a user equipment UE; receiving, by a small cell (small cell), a configuration message sent, through a wired or wireless interface, by the macro base station; and establishing, by the small cell, a user plane connection between the small cell and the UE based on the RRC connection and the configuration message, and establishing a data bearer with the UE on the user plane connection.

13 Claims, 9 Drawing Sheets

(51) Int. Cl.
H04W 24/02 (2009.01)
H04W 88/06 (2009.01)
H04W 88/08 (2009.01)
H04W 76/04 (2009.01)
H04W 76/02 (2009.01)
H04W 84/04 (2009.01)
H04W 74/00 (2009.01)
H04W 92/20 (2009.01)
H04W 36/04 (2009.01)
H04W 88/04 (2009.01)
H04L 5/00 (2006.01)

(52) U.S. Cl.
CPC .......... H04W 88/06 (2013.01); H04W 88/08 (2013.01); *H04L 5/001* (2013.01); *H04L 5/0035* (2013.01); *H04L 5/0098* (2013.01); *H04W 36/04* (2013.01); *H04W 74/006* (2013.01); *H04W 76/02* (2013.01); *H04W 84/045* (2013.01); *H04W 88/04* (2013.01); *H04W 92/20* (2013.01)

(56) References Cited

U.S. PATENT DOCUMENTS

| | | |
|---|---|---|
| 2009/0092097 A1 | 4/2009 | Nylander et al. |
| 2010/0009675 A1 | 1/2010 | Wijting et al. |
| 2010/0227627 A1 | 9/2010 | Ishii et al. |
| 2011/0092234 A1 | 4/2011 | Kim et al. |
| 2012/0142357 A1* | 6/2012 | Aminaka .......... H04W 36/0055 455/437 |
| 2012/0218966 A1 | 8/2012 | Yamazaki et al. |
| 2014/0004863 A1 | 1/2014 | Zhang et al. |

FOREIGN PATENT DOCUMENTS

| | | | |
|---|---|---|---|
| CN | 101816209 A | 8/2010 | |
| EP | 2603038 A1 | 6/2013 | |
| JP | 746248 A | 2/1995 | |
| JP | 9200841 A | 7/1997 | |
| JP | 9200861 A | 7/1997 | |
| JP | 201187300 A | 4/2011 | |
| JP | 201460787 A | 4/2014 | |
| WO | 2010105145 A1 | 9/2010 | |
| WO | 2011083866 A1 | 7/2011 | |
| WO | 2011137784 A1 | 11/2011 | |
| WO | 2013040070 A1 | 3/2013 | |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9) 3GPP TS 36.300 V9.3.0, Mar. 2010, 166 pages.

Ericsson, et al., "Spectrum migration solutions for HSPA," 3GPP TSG-RAN WG1 #64, Tdoc R1-11XXXX, Taipei, Taiwan, Feb. 21-25, 2011, 12 pages.

IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Computer Society, IEEE Std 802.11-2012, Mar. 2012, 2793 pages.

International Search Report and Written Opinion received in Application No. PCT/CN2012/077053 mailed Sep. 27, 2012, 10 pages.

3rd Generation Partnership Project; Technical Specification Group Radio Access Network; Evolved Universal Terrestrial Radio Access (E-UTRA) and Evolved Universal Terrestrial Radio Access Network (E_UTRAN); Overall description; Stage 2 (Release 10), 3GPP TS 36.300, V10.4.0, Jun. 2011, 98 pages.

Release 10, 3GPP TS 36.300, V10.4.0, Jun. 2011, 96 pages.

Ishii, et al., "A Novel Architecture for LTE-B," GC'12 Workshop: International Workshop on Emerging Technologies for LTE-Advanced and Beyond-4G, Dec. 3, 2012, 8 pages.

Iwamura, et al., "Carrier Aggregation Framework in 3GPP LTE-Advanced," WiMAX/LTE, IEEE Communication Magazine, Aug. 2010, 8 pages.

Liu, et al., "A 25 Gb/s(/km2) Urban Wireless Network Beyond IMT-Advanced," IMT-Advanced and Next Generation Mobile Networks, IEEE Communications Magazine, Feb. 2011, 8 pages.

* cited by examiner

WIRELESS BROADBAND COMMUNICATION METHOD, DEVICE, AND SYSTEM TO ESTABLISH A BEARER BETWEEN A USER EQUIPMENT AND A SMALL CELL

This application is a continuation of International Application No. PCT/CN2012/077053, filed on Jun. 16, 2012, which claims priority to Chinese Patent Application No. 201110199326.8, filed on Jul. 15, 2011, both of which are hereby incorporated by reference in their entireties.

TECHNICAL FIELD

With the development of science and technologies, people have increasingly high requirements for mobile communications services and quality. The research focuses on improving transmission quality and lowering operating expense using limited spectrum resources.

At present, mobile communications based on wireless technologies have found wide applications in the markets for indoor applications and outdoor applications. Wireless technologies are used in such a great scale, and currently the driving force for the development of mobile communications also comes from the demands for broadband data services, which causes a considerable impact on public mobile wireless networks, especially on long term evolution technologies (LTE) that are also targeted in indoor scenarios.

In the prior art, the logical architecture of an LTE Home eNodeB is connected to a mobility management entity (MME) through an S1 interface. Because the number of LTE Home eNodeBs is large, if LTE Home eNodeBs are directly connected to an MME through an S1 interface, both the performance and cost of the MME are influenced significantly. Therefore, by standard, one intermediate node, that is, one Home eNB gateway (HeNB Gateway, HeNB GW), is added between an MME and an LTE Home eNodeB to avoid too many S1 interfaces on the MME.

As for functions, a Home eNB has functions identical to those of a common base station, and fails to meet the demands in increasing bandwidth and capacity and at the same time lowering cost in next-generation mobile broadband communications technologies.

BACKGROUND

With the development of science and technologies, people have increasingly high requirements for mobile communications services and quality. The research focuses on improving transmission quality and lowering operating expense using limited spectrum resources.

At present, mobile communications based on wireless technologies have found wide applications in the markets for indoor applications and outdoor applications. Wireless technologies are used in such a great scale, and currently the driving force for the development of mobile communications also comes from the demands for broadband data services, which causes a considerable impact on public mobile wireless networks, especially on long term evolution technologies (LTE) that are also targeted in indoor scenarios.

In the prior art, the logical architecture of an LTE Home eNodeB is connected to a mobility management entity (MME) through an S1 interface. Because the number of LTE Home eNodeBs is large, if LTE Home eNodeBs are directly connected to an MME through an S1 interface, both the performance and cost of the MME are influenced significantly. Therefore, by standard, one intermediate node, that is, one Home eNB gateway (HeNB Gateway, HeNB GW), is added between an MME and an LTE Home eNodeB to avoid too many S1 interfaces on the MME.

As for functions, a Home eNB has functions identical to those of a common base station, and fails to meet the demands in increasing bandwidth and capacity and at the same time lowering cost in next-generation mobile broadband communications technologies.

SUMMARY OF THE INVENTION

Embodiments of the present invention provide a wireless broadband communication method, device, and system, so as to increase bandwidth and capacity of mobile broadband communications and at the same time lower cost.

An embodiment of the present invention provides a user equipment. A third connection establishment unit is configured to establish a Radio Resource Control RRC connection with a macro base station. A reconfiguration message receiving unit is configured to receive an RRC reconfiguration message sent by the macro base station to the UE after the third connection establishment unit has established the RRC connection. A second connection and bearer establishment unit is configured to establish a user plane connection with a small cell (small cell) through an air interface based on the RRC reconfiguration message received by the reconfiguration message receiving unit, and establish a data bearer with the small cell on the user plane connection.

An embodiment of the present invention provides a wireless broadband communication method. A user equipment UE established a Radio Resource Control RRC connection with a macro base station. An RRC reconfiguration message sent by the macro base station to the UE is received after the UE has established the RRC connection. The UE establishes a user plane connection with a small cell through an air interface based on the RRC reconfiguration message, and a data bearer with the small cell on the user plane connection.

An embodiment of the present invention provides a macro base station. A second connection establishment unit is adapted to establish a Radio Resource Control RRC connection with a UE. A configuration message sending unit is adapted to send an RRC reconfiguration message to the UE through a wireless interface, and send a configuration message to a small cell through a wired or wireless interface after the second connection establishment unit has established the RRC connection. The RRC reconfiguration message and the configuration message are used for the small cell and the UE to establish a user plane connection.

An embodiment of the present invention provides a wireless broadband communication method. A macro base station establishes a Radio Resource Control RRC connection with a UE. The macro base station sends an RRC reconfiguration message to the UE through a wireless interface and a configuration message to a small cell through a wired or wireless interface. The RRC reconfiguration message and the configuration message are used for the small cell and the UE to establish a user plane connection.

An embodiment of the present invention provides a small cell. A configuration message receiving unit receives a configuration message sent, through a wired or wireless interface, by a macro base station. A first connection and bearer establishment unit is adapted to establish a user plane connection between the small cell and a UE based on the configuration message received by the configuration message receiving unit, and establish a data bearer with the UE on the user plane connection.

An embodiment of the present invention provides a wireless broadband communication method. A small cell receives a configuration message sent, through a wired or wireless interface, by a macro base station. The small cell establishes a user plane connection between the small cell and a UE based on the configuration message and establishes a data bearer with the UE on the user plane connection.

An embodiment of the present invention provides a wireless broadband communication system, which includes the foregoing small cell and the foregoing macro base station.

Compared with the prior art, in the method, device, and system provided in the embodiments of the present invention, a user equipment UE first establishes a Radio Resource Control RRC connection with a macro base station, and the macro base station then performs resource configuration on a small cell, and establishes a user plane connection between the UE and the small cell, so that the effect of traffic splitting for user plane data is achieved, bandwidth and capacity of mobile broadband communications are increased, and cost is lowered.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
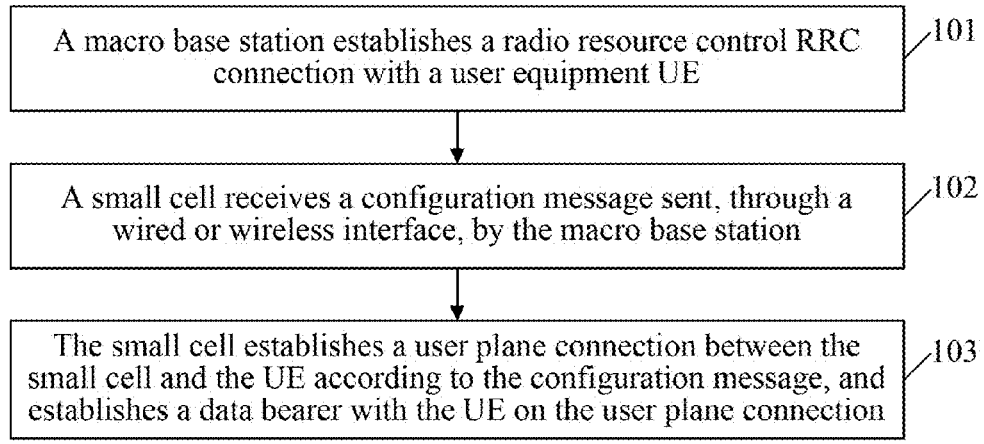
FIG. 1 is a flow chart of a wireless broadband communication method according to an embodiment of the present invention.

FIG. 1 is a flow chart of a wireless broadband communication method according to an embodiment of the present invention. This embodiment includes:

Step 101. A macro base station establishes a Radio Resource Control RRC connection with a user equipment UE.

Step 102. A small cell receives a configuration message sent, through a wired or wireless interface, by the macro base station.

Step 103. The small cell establishes a user plane connection between the small cell and the UE based on the configuration message, and establishes a data bearer with the UE on the user plane connection.

The execution subject in this embodiment of the present invention is a small cell. A small cell may be a picocell (Pico), a femtocell (Femto), a low mobility cell (Low Mobility, LoMo), other local wireless access points AP, or a UE having a device-to-device (D2D) function. In this embodiment, for example, the small cell is a LoMo.

A macro base station is mainly adapted to implement a control plane function of the UE, which includes a mobility management function of the UE. The LoMo is mainly adapted to bear an indoor low mobility data service, so as to implement a user plane function. Specifically, a separate transfer manner is adopted, in which different paths are used for transfer of user plane data and transfer of control plane data for an air interface. That is, a link from the LoMo to the UE only transmits user plane data, whereas control plane signaling from the LoMo to the UE is established through a link from the macro base station to the UE.

Figure 2:
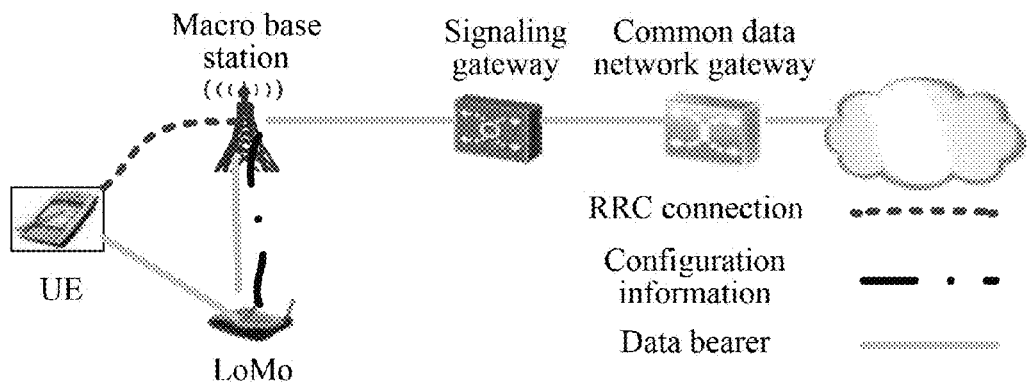
FIG. 2 is a network topology diagram according to an embodiment of the present invention.

As shown in FIG. 2, the macro base station is directly connected to the UE through an air interface without a LoMo. The LoMo establishes an RRC connection through such an interface between the macro base station and the UE. The macro base station is connected to the LoMo through a wired or wireless interface. The wired interface includes: an S1 interface between a base station and a mobility management entity MME, and/or an X2 interface between base stations, and/or a common public radio interface CPRI, and/or an Iub interface between a wireless network controller and a base station. The LoMo receives, through such an interface, a configuration message sent by the macro base station through a wired or wireless interface. The wireless interface includes: a Uu interface between a base station and a UE and/or a microwave interface for base station transmission. The data bearer between the LoMo and the UE is configured by the foregoing interface between the macro base station and the UE.

Figure 3:
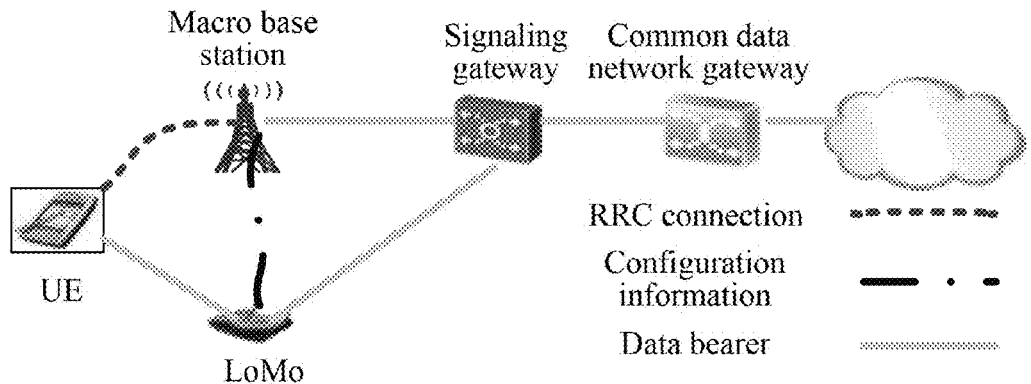
FIG. 3 is another network topology diagram according to an embodiment of the present invention.

After receiving the user plane data of the UE through the data bearer, the LoMo can send the user plane data to the macro base station through the wired or wireless interface between the macro base station and the LoMo in FIG. 2, so as to enable the macro base station to forward the user plane data of the UE to a core network element. Alternatively, the user plane data of the UE can further be directly sent to the core network element through the interface between the core network element and the LoMo in FIG. 3. The core network element in FIG. 3 is a service gateway S-GW.

If the LoMo performs data transmission with the core network element directly, the LoMo needs to inform the mobility management entity MME of the address of the LoMo. The MME informs the core network element. The MME then informs the macro base station of an address of the core network element, and the macro base station forwards the address to the LoMo. The foregoing address may include: a Transport Network Layer address TNL address, a General Packet Radio Service Tunneling Protocol-Tunnel Endpoint Identifier GTP-TEID and/or an Internet Protocol IP address.

Figure 4:
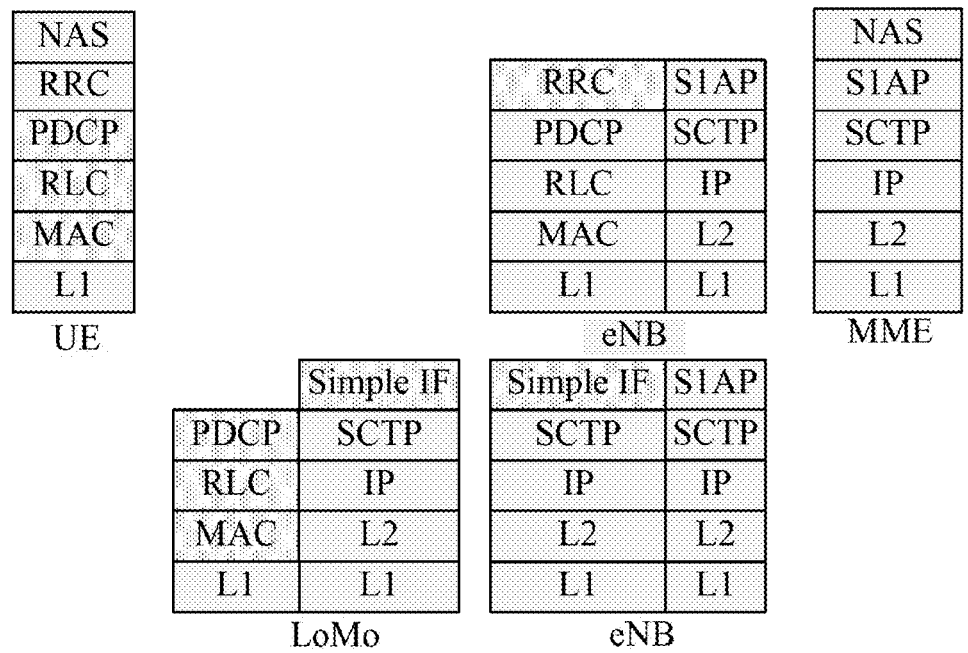
FIG. 4 is a structural diagram of a protocol stack according to an embodiment of the present invention.
Figure 5:
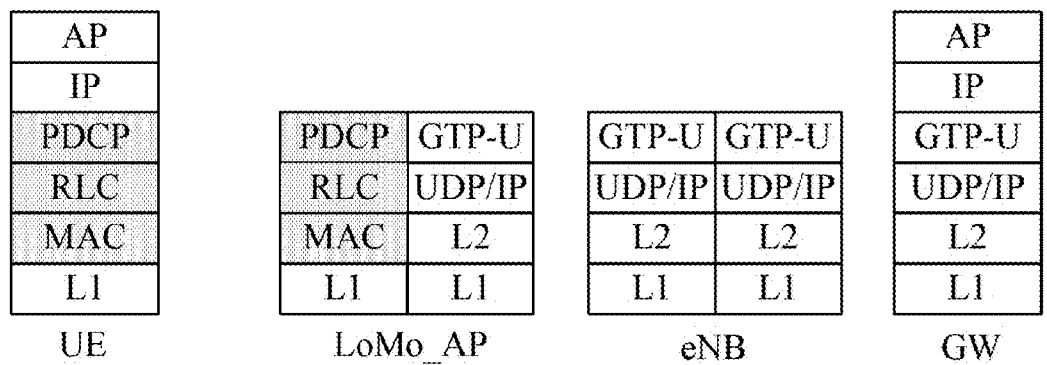
FIG. 5 is a structural diagram of another protocol stack according to an embodiment of the present invention.

A protocol stack of an air interface between a LoMo and a UE may only include: the Packet Data Convergence Protocol (PDCP), Radio Link Control RLC layer protocol, Media Access Control MAC layer protocol, and Layer 1 L1 protocol; and/or does not include: the Radio Resource Control RRC layer protocol. That is, on a control plane, simplified protocol stack architecture can be adopted for a protocol stack of an air interface between a LoMo and a UE, for example, no RRC protocol entity is provided, as shown in FIG. 4, on a user plane, an original user plane protocol stack PDCP/RLC/MAC may be adopted for a LoMo and a UE, and only the functions are tailored, as shown in FIG. 5.

Figure 6:
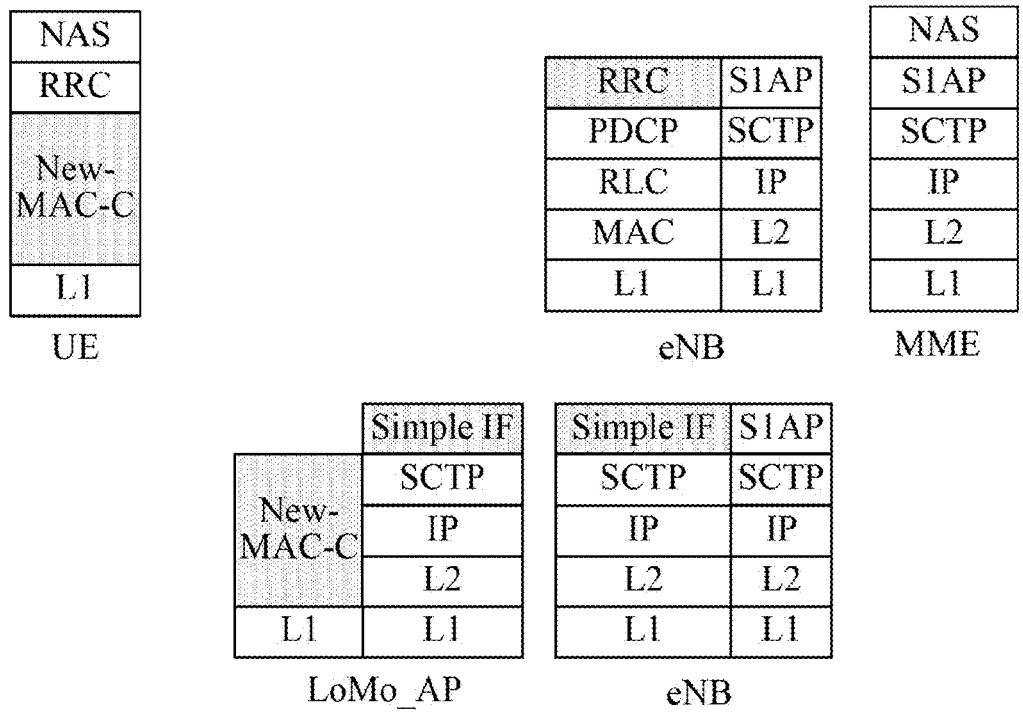
FIG. 6 is a structural diagram of another protocol stack according to an embodiment of the present invention.
Figure 7:
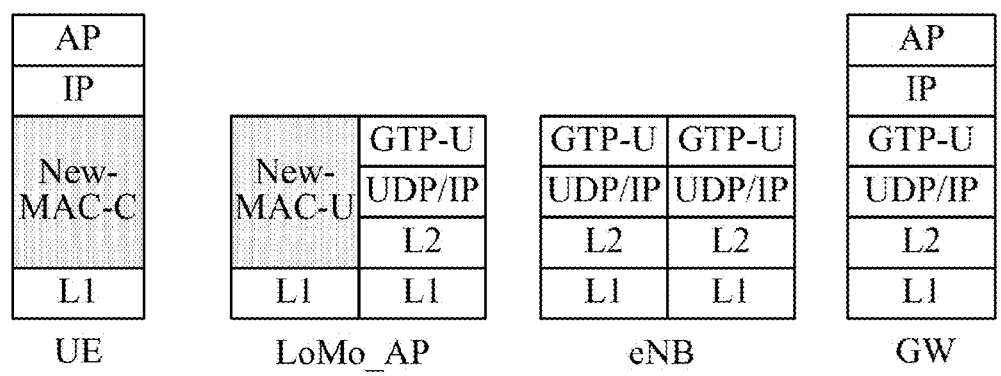
FIG. 7 is a structural diagram of another protocol stack according to an embodiment of the present invention.

For a control plane protocol stack between a LoMo and a UE, the PDCP, RLC, and MAC may be further combined into one new layer entity, as shown in FIG. 6. For a user plane protocol stack between a LoMo and a UE, the PDCP, RLC, and MAC may be further combined into one new layer entity, as shown in FIG. 7.

When a small cell is a UE having a D2D function, before step 101, the following step may be further included: Step 104. When the small cell is near the UE, the UE initiates an RRC connection to the macro base station to establish a service. The macro base station determines that data requested by the UE is stored in the small cell. That is, when it has been determined that data requested by the UE is present in a nearby small cell, the macro base station directly enables the small cell to transmit the data to the UE.

The foregoing configuration message may further include: allocation information for a static or semi-static configuration resource; resource allocation information for random access on the static or semi-static configuration resource or resource allocation information for random access and data scheduling. If the configuration message only includes the resource allocation information for random access, after the small cell has established the data bearer with the UE on the user plane connection, it is further included that: the small cell sends to the UE the resource allocation information for random access on the static or semi-static configuration resource through the established data bearer. If the configuration message includes the static or semi-static resource allocation information for random access and data scheduling, after the small cell has established the data bearer with the UE on the user plane connection, it is further included that: the small cell sends to the UE the resource allocation information for random access and data scheduling on the static or semi-static configuration resource configuration resource through the established data bearer. If congestion occurs during random access or random access and data scheduling based on the resource allocation information, it is further included that: the small cell reapplies for a static or semi-static configuration resource from the macro base station; or the small cell instructs the macro base station to hand over the UE to the macro base station; or the small cell adopts a dynamic scheduling manner for new access where resource congestion occurs.

The functions of the macro base station and the LoMo are compared in the following table. The LoMo column lists the functions capable of being simplified of a LoMo:

TABLE 1

Function Comparison Table of a Macro Base Station and a LoMo

| Compared Items | eNB | LoMo |
| --- | --- | --- |
| Random access channel (RACH) | Contention access/non-contention access | Non-contention access only |
| Hybrid automatic retransmission (HARQ) | HARQ | Simple HARQ, for example, fewer retransmission times |
| Scheduling mechanism | Dynamic scheduling/semi-static scheduling (SPS) | Simple scheduling |
| Uplink scheduling information | Buffer status report (BSR)/power headroom report (PHR)/scheduling priority level processing | For example, no power headroom report |
| DRX (discontinuous reception) | Long and short DRX periods | For example, a longer DRX period |

Compared with the prior art, in the method provided in the embodiment of the present invention, a small cell may establish a Radio Resource Control RRC connection with a user equipment UE through a macro base station, and the macro base station then configures the small cell, so that the procedure of establishing an RRC connection with a UE is omitted and cost is lowered. Next, the small cell establishes a data bearer with the UE to share data traffic with the macro base station, so that bandwidth and capacity of mobile broadband communications are increased.

Figure 8:
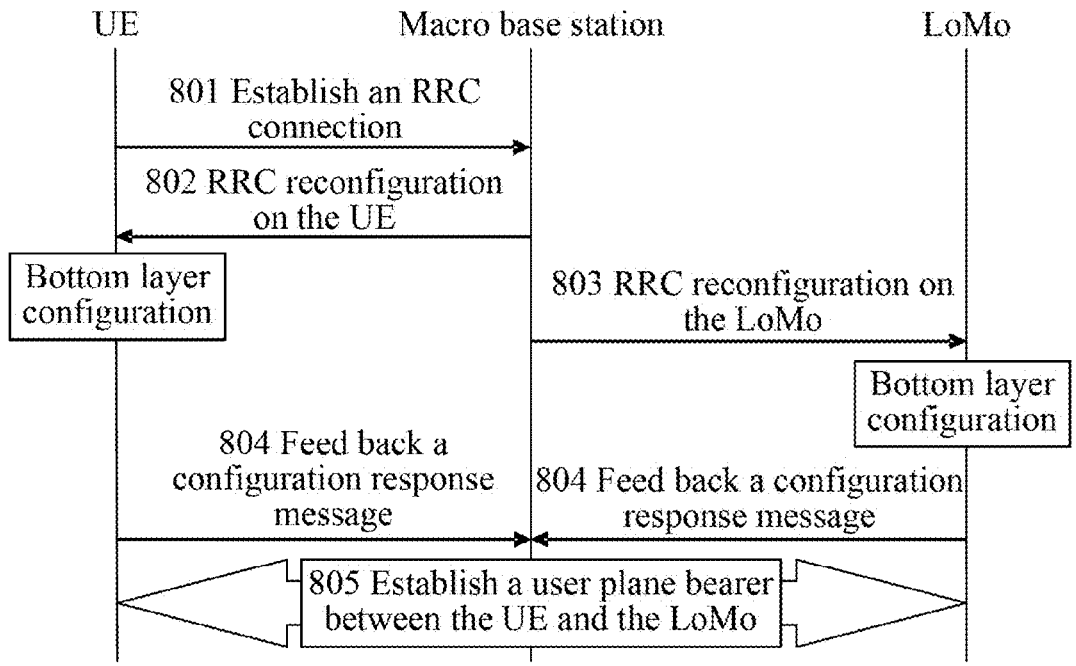
FIG. 8 is a diagram of signaling interaction of a wireless broadband communication method according to an embodiment of the present invention.

FIG. 8 is a diagram of signaling interaction of a wireless broadband communication method according to an embodiment of the present invention. This embodiment includes:

Step 801. A UE does not directly access a LoMo, and instead, when a UE initiates a service, establishes an RRC connection with a macro base station first and performs normal authentication and encryption.

Step 802. The macro base station performs RRC reconfiguration on the UE to establish a corresponding second signaling radio bearer SRB 2, data radio bearer DRB, measurement control configuration, and the like; after receiving an RRC reconfiguration message (RRC reconfiguration), the UE performs bottom layer configuration, which includes radio resource configuration, measurement configuration, and the like.

Step 803. The macro base station needs to complete, while sending the RRC reconfiguration message (RRC reconfiguration), the configuration of a bottom layer user plane protocol stack (including the PDCP, RLC, and MAC) or a newly defined user plane entity (new MAC) of the LoMo through one newly defined interface (simple IF). A configuration message transferred by the interface (simple IF) includes radio resource configuration (logical channel configuration, transmission channel configuration, and physical channel configuration), measurement configuration, and the like.

Specifically, in an indoor coverage scenario, the number of UEs is small, and the radio resource configuration may be a static or semi-static RACH resource and/or a static or semi-static physical transmission resource. The static or semi-static resource information is set according to a resource use condition of resident users under an AP.

Here, steps 802 and 803 may be performed at the same time or performed in sequence.

Step 804. The UE and the LoMo feed a configuration response message back to the macro base station, respectively.

According to the different information transferred by the interface (simple IF), three choices are as follows:

Choice 1: Only a static or semi-static RACH resource is included, and subsequently scheduled information is then informed by the LoMo through a MAC CE (MAC control element).

Choice 2: The configuration message includes static or semi-static resource information for random access and subsequent scheduling of the UE, and if congestion occurs in resource allocation, the LoMo reapplies for semi-static resource allocation from the macro base station or hands over the UE to the macro base station.

Choice 3: The configuration message includes static semi-static resource information for random access and subsequent scheduling of the UE, and if resource congestion occurs during the subsequent access of the UE, a dynamic scheduling manner is adopted for access after the resource congestion has occurred.

Step 805. The UE and the LoMo establish a user plane bearer.

The relationship between this embodiment and the embodiment in FIG. 1 lies in that, in this embodiment, that the small cell receives the configuration message sent, through a wired or wireless interface, by the macro base station, and performs configuration based on the configuration message includes: the small cell receives user plane protocol configuration information sent, through a wired or wireless interface, by the macro base station, and the small cell configures a radio resource and a measurement parameter for establishing a user plane connection with the UE.

Compared with the prior art, in the method provided in the embodiment of the present invention, a small cell may establish a Radio Resource Control RRC connection with a user equipment UE through a macro base station, and the macro base station then configures the small cell, so that the procedure of establishing an RRC connection with a UE is omitted and cost is lowered. Next, the small cell establishes a data bearer with the UE to share data traffic with the macro base station, so that bandwidth and capacity of mobile broadband communications are increased.

Figure 9:
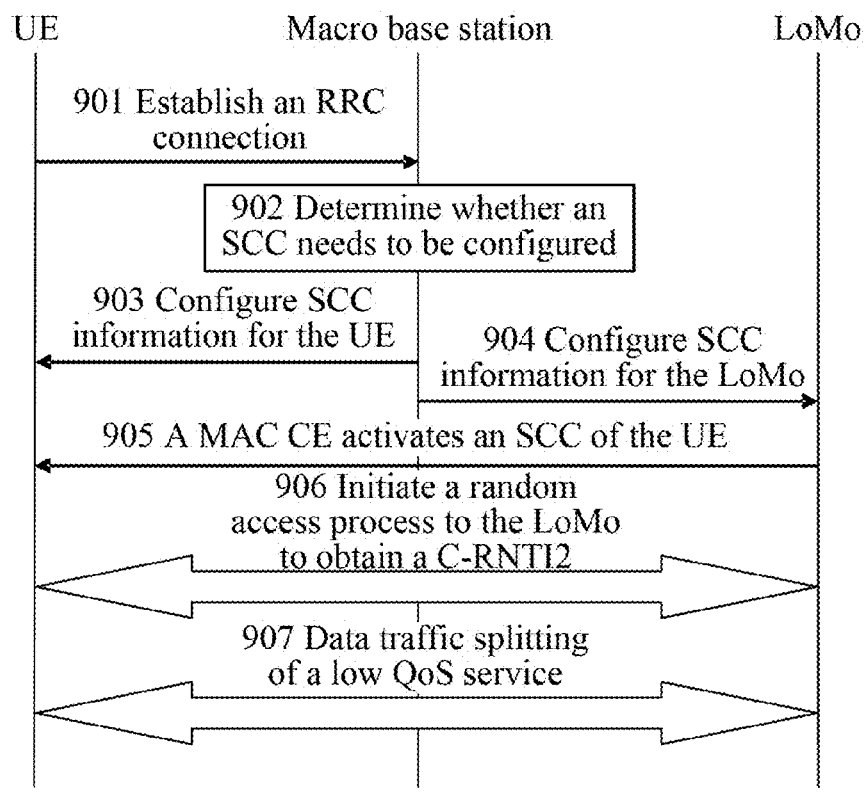
FIG. 9 is a diagram of signaling interaction of a wireless broadband communication method according to an embodiment of the present invention.

FIG. 9 is a diagram of signaling interaction of a wireless broadband communication method according to an embodiment of the present invention. This embodiment includes the following steps.

Step 901. A UE establishes an RRC connection with a macro base station first.

Step 902. The macro base station determines, according to service quality (QoS), a scheduling policy, and/or channel quality, and the like of a service, whether one secondary component carrier (SCC) needs to be configured.

Step 903. The macro base station performs SCC relevant configuration on the UE through dedicated signaling configuration.

Step 904. The macro base station configures a LoMo through a newly defined interface message, and the LoMo receives an SCC configuration message of the macro base station.

Step 905. Send an activation message to the UE through the MAC CE of the LoMo.

Step 906. After receiving the activation message, the UE performs random access of the LoMo and obtains a new second cell-radio network temporary identifier (C-RNTI 2).

Step 907. IP data traffic splitting is performed at the macro base station of the LTE for the downlink data, services having high QoS requirements such as speech and video are still scheduled by primary component carriers PCCs, and physical downlink control channel (PDCCH) scrambling is performed by adopting a first cell-radio network temporary identifier C-RNTI 1 allocated by the RRC connection; services having low Qos requirements are provided by SCCs, and pdcch scrambling is performed by adopting the C-RNTI 2 obtained through random access of the LoMo.

The relationship between this embodiment and the embodiment in FIG. 1 lies in that, in this embodiment, that a small cell receives a configuration message sent, through a wired or wireless interface, by a macro base station, and performs configuration based on the configuration message includes: the small cell receives SCC configuration information sent, through a wired or wireless interface, by the macro base station, and the small cell configures an SCC for establishing a user plane connection with the UE.

In this embodiment, the correlation between a PCC and an SCC is permanent, that is to say, the link between a UE and a macro base station is always a PCC, and the link between a UE and a LoMo is always an SCC.

Compared with the prior art, in the method provided in the embodiment of the present invention, a small cell may establish a Radio Resource Control RRC connection with a user equipment UE through a macro base station, and the macro base station then configures the small cell, so that the procedure of establishing an RRC connection with a UE is omitted and cost is lowered. Next, the small cell establishes a data bearer with the UE to share data traffic with the macro base station, so that bandwidth and capacity of mobile broadband communications are increased.

Figure 10:
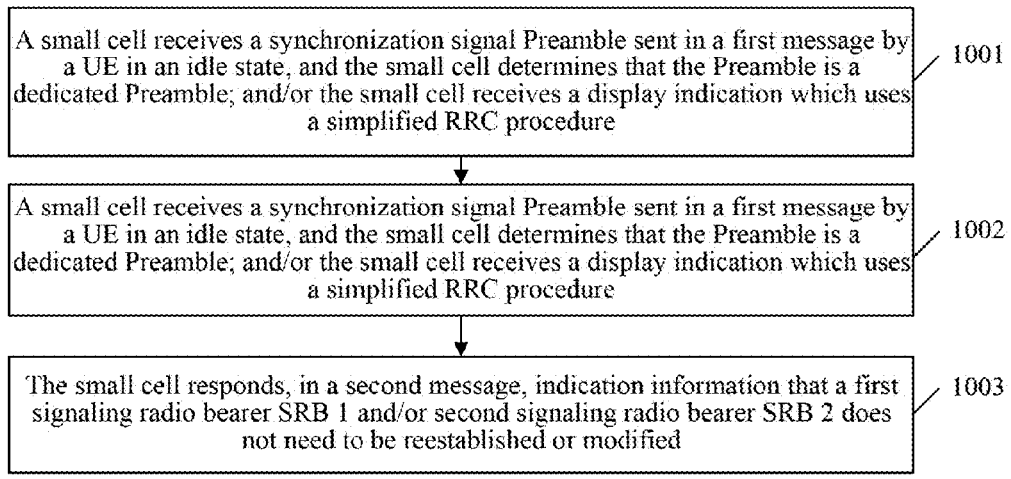
FIG. 10 is a flow chart of another wireless broadband communication method according to an embodiment of the present invention.

FIG. 10 is a flow chart of another wireless broadband communication method according to an embodiment of the present invention. This embodiment includes:

Step 1001. A small cell receives a synchronization signal Preamble sent in a first message by a UE in an idle state, and the small cell determines that the Preamble is a dedicated Preamble; and/or the small cell receives a display indication using a simplified RRC procedure.

Step 1002. The small cell responds in a second message indication information about that a first signaling radio bearer SRB 1 and/or second signaling radio bearer SRB 2 does not need to be reestablished or modified.

Step 1003. Instruct the UE to access a network through the small cell.

The execution subject in this embodiment of the present invention is a small cell. The small cell may be: a picocell (Pico), a femtocell (Femto), or other local wireless access points AP and low mobility cells (Low Mobility, LoMo). In this embodiment, for example, the small cell is a LoMo.

In an embodiment of the present invention, the LoMo may be located at a coverage hole of the macro base station. The UE can separately reside on the LoMo.

Figure 11:
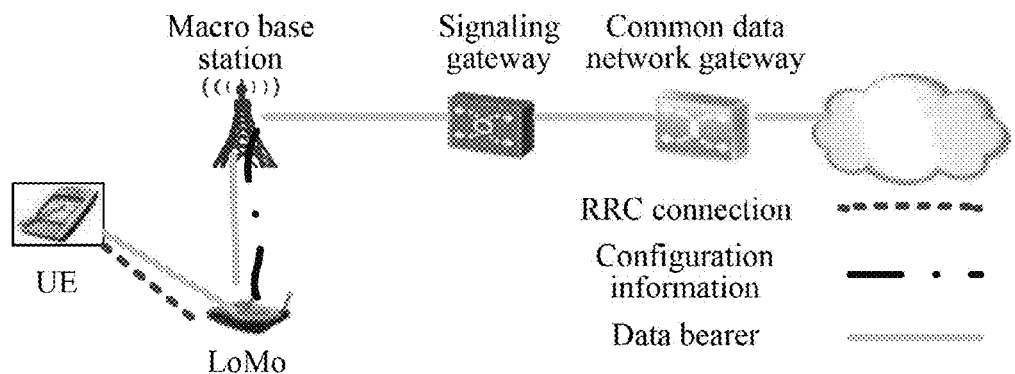
FIG. 11 is another network topology diagram according to an embodiment of the present invention.

As shown in FIG. 11, the macro base station is connected to the LoMo through a wired or wireless interface. The wired interface may include an S1 interface between a base station and a mobility management entity MME, and/or an X2 interface between base stations, and/or a common public radio interface CPRI, and/or an Iub interface between a wireless network controller and a base station. The LoMo receives, through such an interface, a configuration message sent by the macro base station through a wired or wireless interface. The wireless interface includes a Uu interface between a base station and a UE and/or a microwave interface for base station transmission. The LoMo may also be connected to the UE through an air interface without a macro base station, and such an interface bears a signaling and data bearer between the UE and the LoMo.

Figure 12:
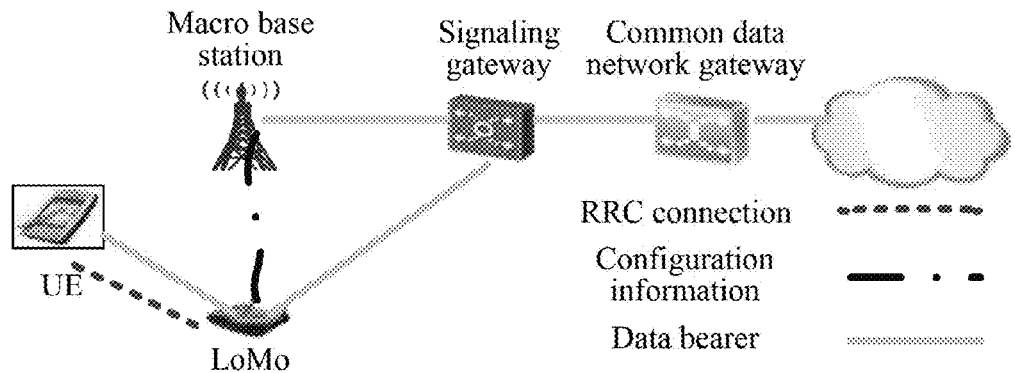
FIG. 12 is another network topology diagram according to an embodiment of the present invention.

The LoMo may send, after receiving the user plane data of the UE through the data bearer, the user plane data to the macro base station through the wired or wireless interface between the macro base station and the LoMo in FIG. 11, so that the macro base station forwards the user plane data of the UE to a core network element; or, further directly send the user plane data of the UE to the core network element through the interface between the core network element and the LoMo in FIG. 12. The core network element in FIG. 12 is a service gateway S-GW.

If the LoMo performs data transmission with the core network element directly, the LoMo needs to inform the mobility management entity MME of the address of the LoMo. The MME informs the core network element. The MME then informs the macro base station of an address of the core network element, and the macro base station forwards the address to the LoMo. The foregoing address may include a TNL address, a GTP-TEID, and/or an Internet Protocol IP address.

Figure 13:
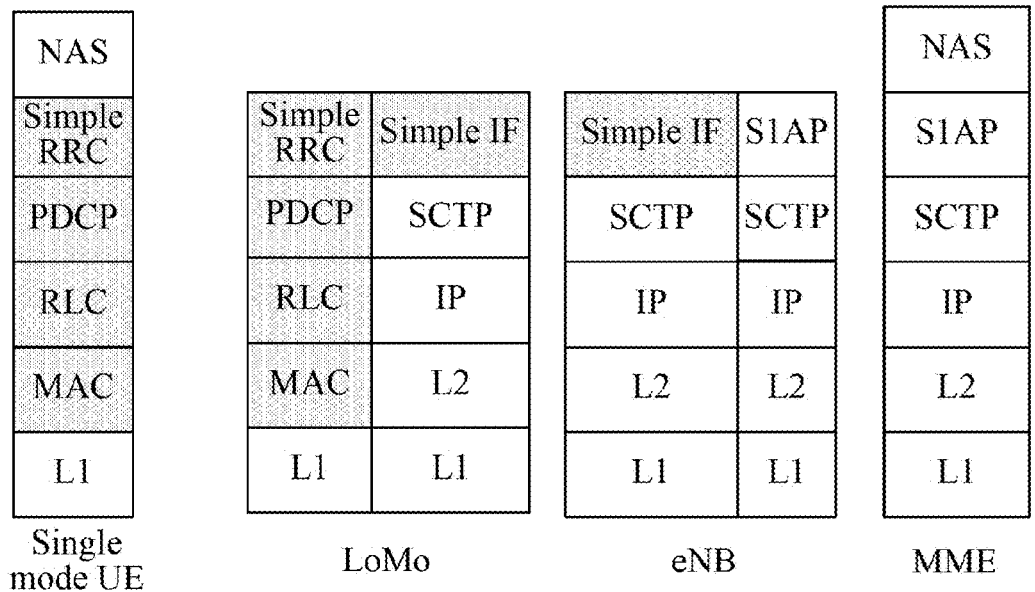
FIG. 13 is a structural diagram of another protocol stack according to an embodiment of the present invention.
Figure 14:
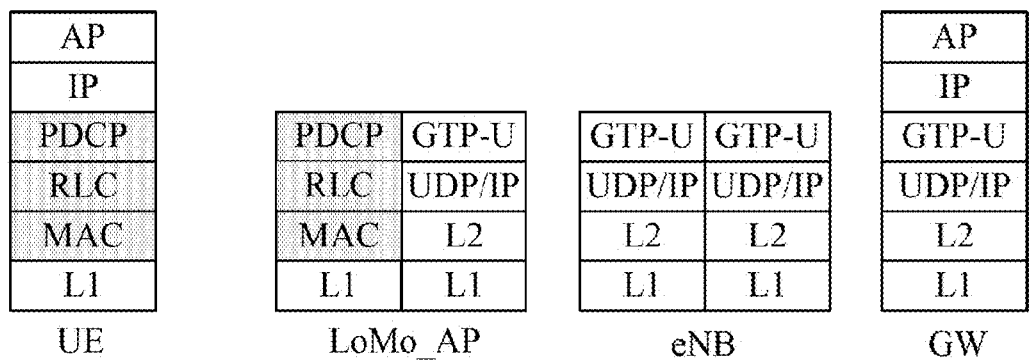
FIG. 14 is a structural diagram of another protocol stack according to an embodiment of the present invention.

A protocol stack of an air interface between a LoMo and a UE may only include: On a control plane, simplified protocol stack architecture can be adopted for a protocol stack of an air interface between a LoMo and a UE, for example, a simplified RRC protocol entity is provided, as shown in FIG. 13. As for functions, the simplified RRC procedure shown in FIG. 10 may be adopted. On a user plane, an original user plane protocol stack PDCP/RLC/MAC may be adopted for a LoMo and a UE, and only the functions are tailored. The protocol stack is shown in FIG. 14, and the simplified part of functions is shown in Table 1.

Figure 15:
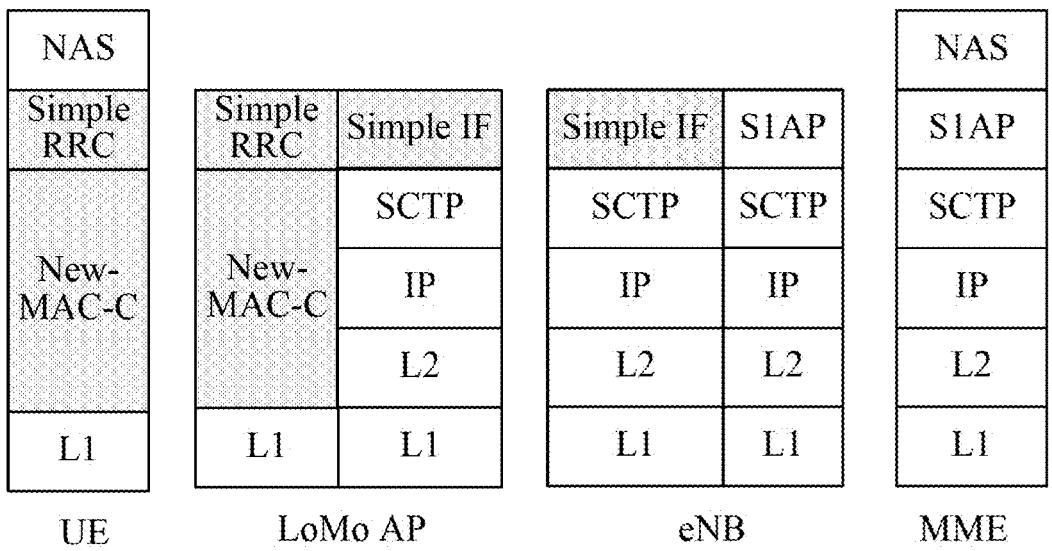
FIG. 15 is a structural diagram of another protocol stack according to an embodiment of the present invention.
Figure 16:
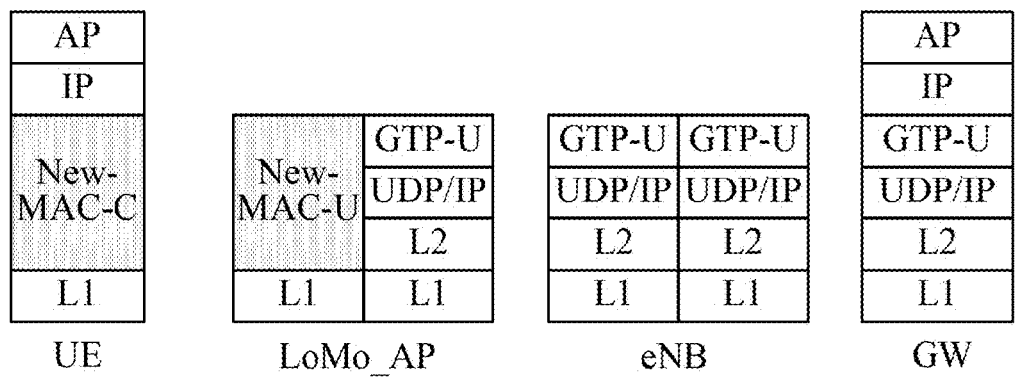
FIG. 16 is a structural diagram of another protocol stack according to an embodiment of the present invention.

A control plane protocol stack between a LoMo and a UE can further combine the PDCP, RLC, and MAC into a new layer entity, as shown in FIG. 15. A user plane protocol stack between a LoMo and a UE can further combine the PDCP, RLC, and MAC into a new layer entity, as shown in FIG. 16.

The foregoing network configuration includes at least one of the following: logical channel configuration, signaling radio bearer SRB configuration, MAC layer configuration, semi-static scheduling configuration, physical channel configuration, and an RRC message timer parameter.

If handover between small cells or handover from a small cell to a macro base station or handover from a macro base station to a small cell needs to be executed, after the instructing the UE to access the network through the small cell, the following steps are further included:

Step 1004. The small cell receives measurement control information sent by a macro base station and forwards the measurement control information to the UE.

Step 1005. Receive a measurement report fed back by the UE and forward the measurement report to the macro base station.

Step 1006. If the macro base station judges that handover needs to be performed, a handover instruction sent by the macro base station needs to be received.

In the method provided in the embodiment of the present invention, a small cell learns whether a UE needs to reestablish or modify an SRB 1 and/or an SRB 2 through determining a Preamble or display indication sent by a UE, if it is determined not, directly responds that an SRB 1 and/or SRB 2 does not need to be reestablished or modified, and instructs the UE to access the network, so that the procedure of establishing an SRB 1 and/or SRB 2 is omitted and cost is lowered. Next, the UE accesses the network through the small cell to share data traffic with the macro base station, so that bandwidth and capacity of mobile broadband communications are increased.

Figure 17:
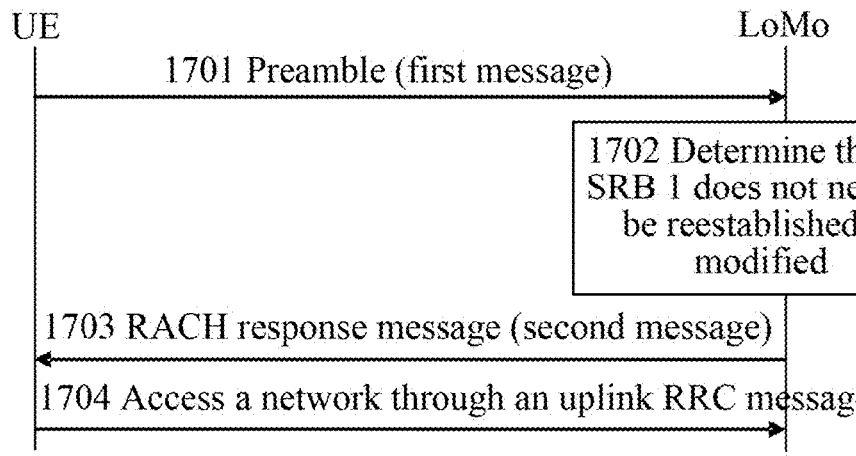
FIG. 17 is a diagram of signaling interaction of another wireless broadband communication method according to an embodiment of the present invention.

FIG. 17 is a diagram of signaling interaction of another wireless broadband communication method according to an embodiment of the present invention. This embodiment includes:

Step 1701. A UE accesses a LoMo and sends a Preamble or display indication to the LoMo.

Step 1702. The LoMo determines that an SRB 1 and/or SRB 2 does not need to be reestablished or modified.

Step 1703. The LoMo feeds back that the SRB 1 and/or SRB 2 does not need to be reestablished or modified.

Step 1704. The UE accesses a network and notifies that network connection has been established through one uplink RRC message, the uplink RRC message including carrying a connection request cause, a resided PLMN network, and the like.

In consideration of scenarios of low mobility and indoor coverage for a UE, both the state of a UE and the state of a network probably do not change much, and therefore default configuration can be adopted for many configurations, including logical channel configuration (a transmission mode, a logical channel priority level, and the like), SRB configuration (a logical channel number, an configuration parameter of an RLC, a logical channel group, a logical channel priority level, a priority bit rate, and the like), MAC layer configuration (configurations such as whether TTI bundling TTI bundling is supported, HARQ maximum retransmission times, a buffer status report BSR, a power headroom report PHR, discontinuous reception DRX), semi-static scheduling configuration, physical channel configuration, and timer parameters of some RRC messages.

After the UE enters the LoMo to acquire the configuration initially, the UE stores the configurations for use next time. For access a next time, because both the state of the UE and the state of the network only change a little, the procedure of establishing an RRC connection can be significantly simplified.

A user in an idle state accesses the LoMo and initiates a dedicated random access or display indication. The LoMo can identify the UE according to the dedicated preamble code.

The LoMo responds a random access response message (random access response) according to the identity of the UE, and in the message a bit is used for representing whether the configuration of the SRB 1 and/or SRB 2 changes. The UE determines whether a default configuration can be used for dedicated resource configuration of the UE according to the bit.

If the configurations are same, it indicates that the UE does not need to reestablish the SRB 1 and/or SRB 2. After random access is completed, the UE can directly send an uplink RRC message and do not need to process an RRC connection again. Such an uplink RRC message may be a new message or may also reuse an existing RRC connection complete (RRC connection complete) message or an RRC connection request (RRC connection request) message, which contains a UE ID, an establishment cause, a selected carrier network PLMN, a dedicated NAS message, and the like. The modification procedure is shown in the following figures.

If handover occurs, for all the following handover types, handover judgment and admission control take place on a macro base station, as shown in FIG. 11 and FIG. 12:

handover from a LoMo to a macro base station;
handover from a macro base station to a LoMo; and
handover from a LoMo to another LoMo.

In a process that a UE is handed over from an LTE LoMo to an LTE macro base station, the LTE macro base station first sends a new interface contained measurement control message to the LTE LoMo. The LTE LoMo then sends a measurement control message to control the corresponding UE to perform measurement and send a measurement report. After receiving the corresponding measurement report, the LTE LoMo sends a new interface contained measurement report (New IF message contained Measurement report) to the LTE macro base station. The LTE macro base station performs handover judgment, and if access of the UE is allowed, sends a new interface contained handover command to the LTE LoMo. The LTE LoMo sends a handover command to the corresponding UE. The UE is handed over to the coverage of the corresponding LTE macro base station. After the connection with the LTE macro base station has been established, the LTE macro base station instructs the LoMo to release the corresponding resource.

In the process that a UE is handed over from an LTE macro base station to an LTE LoMo, the LTE macro base station first sends a Measurement Control message to control the corresponding UE to perform measurement and send a measurement report, and then can further acquire a load condition of the corresponding LoMo, perform handover judgment, and when it is confirmed that handover corresponding to the LoMo is required, send a Handover Command to the corresponding UE and LoMo. The UE then sends a handover confirm (Handover Confirm) to the LoMo. After receiving the corresponding message, the LoMo sends a resource release request (Resource Release Request) to the LTE macro base station. In the end, the LTE macro base station releases the corresponding resource.

In the method provided in the embodiment of the present invention, a small cell learns whether a UE needs to reestablish or modify an SRB 1 and/or SRB 2 through determining a Preamble sent by the UE, if it is determined not, directly responds that the SRB 1 and/or SRB 2 does not need to be reestablished or modified, and instructs the UE to access a network, so that the procedure of establishing an SRB 1 and/or SRB 2 is omitted and cost is lowered. The UE then accesses a network through the small cell to share data traffic with the macro base station, so that bandwidth and capacity of mobile broadband communications are increased.

Figure 18:
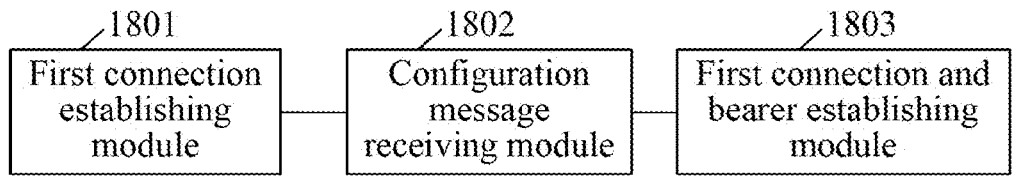
FIG. 18 is a structural diagram of a small cell for wireless broadband communication according to an embodiment of the present invention.

FIG. 18 is a structural diagram of a small cell for wireless broadband communication according to an embodiment of the present invention. This embodiment includes:

A first connection establishment module 1801 is adapted to establish a Radio Resource Control RRC connection with a user equipment UE through a macro base station.

A configuration message receiving module 1802 is adapted to receive a configuration message sent, through a wired or wireless interface, by the macro base station after the first connection establishment module has established the RRC connection.

A first connection and bearer establishment module 1803 is adapted to establish a user plane connection between the small cell and the UE based on the RRC connection and the configuration message received by the configuration message receiving module, and establish a data bearer with the UE on the user plane connection.

The small cell in the embodiment of the present invention can be adapted to execute the method in the corresponding embodiment shown in FIG. 1, 8 or 9.

In the small cell in the embodiment of the present invention, the configuration message receiving module can be adapted to receive user plane protocol configuration information sent, through a wired or wireless interface, by the macro base station after the first connection establishment module has established the RRC connection, so that the small cell further includes a radio resource and measurement parameter configuration module, adapted to configure a radio resource and a measurement parameter for establishing the user plane connection with the UE according to the user plane protocol configuration information received by the configuration message receiving module.

Alternatively, the configuration message receiving module can be adapted to receive secondary component carrier SCC configuration information sent, through a wired or wireless interface, by the macro base station, so that the small cell further includes an activation module, adapted to activate a secondary component carrier SCC for establishing the user plane connection with the UE according to the secondary component carrier SCC configuration information received by the configuration message receiving module.

The small cell in the embodiment of the present invention may further include a data transmission module 1804 is adapted to transmit user plane data between the UE and a core network element through the data bearer established by the first connection and bearer establishment module. The user plane data between the UE and the core network element is directly transmitted through the small cell; or the user plane data between the UE and the core network element is transmitted through a path of the UE, the small cell, the macro base station, and the core network element.

In the small cell in the embodiment of the present invention the wired interface may include a random one of or a random combination of several of the following: an S1 interface between a base station and a mobility management entity MME, an X2 interface between base stations, a common public radio interface CPRI, and an Iub interface between a wireless network controller and a base station.

The wireless interface may include a Uu interface between a base station and a UE and/or a microwave interface for base station transmission.

In the small cell in the embodiment of the present invention, a protocol stack of an air interface between the small cell and the UE, only includes the Packet Data Convergence Protocol PDCP, Radio Link Control RLC layer protocol, Media Access Control MAC layer protocol, and Layer 1 L1 protocol; and/or does not include the Radio Resource Control RRC layer protocol.

In the small cell in the embodiment of the present invention, the configuration message receiving module may be further adapted to receive allocation information of a static or semi-static configuration resource after the first connection establishment module has established the RRC connection; and receive resource allocation information for random access on the static or semi-static configuration resource or resource allocation information for random access and data scheduling after the first connection establishment module has established the RRC connection.

If the configuration message receiving module is adapted to receive the resource allocation information for random access, the small cell in the embodiment of the present invention may further include:

An allocation information sending module 1805 is adapted to send to the UE the resource allocation information for data scheduling on the static or semi-static configuration resource through the established data bearer.

In the small cell in the embodiment of the present invention, the allocation information sending module may be further adapted to send to the UE the resource allocation information for random access on the static or semi-static configuration resource through the established data bearer.

The small cell in the embodiment of the present invention may further include a reapplication module 1806, which is adapted to perform random access based on the resource allocation information received by the configuration message receiving module, or reapplies for a static or semi-static configuration resource from the macro base station when congestion occurs in random access and data scheduling. Alternatively, the small cell in the embodiment of the present invention may further include a handover instruction module 1807, adapted to perform random access based on the resource allocation information received by the configuration message receiving module, or instruct the macro base station to hand over the UE to the macro base station when congestion occurs in random access and data scheduling. The small cell in the embodiment of the present invention may further include a dynamic scheduling module 1808, adapted to perform random access based on the resource allocation information received by the configuration message receiving module, or adopt a dynamic scheduling manner for new access where resource congestion occurs when congestion occurs in random access and data scheduling.

In the small cell in the embodiment of the present invention, the small cell may include a random one of the following: a picocell Pico, a femtocell Femto, a low mobility cell LoMo, a local wireless access point AP, a UE having a device-to-device D2D function, and a low power node low power node.

Compared with the prior art, in the small cell provided in the embodiment of the present invention, a macro base station establishes a Radio Resource Control RRC connection with a user equipment UE, and the macro base station then configures the small cell, so that the procedure of establishing an RRC connection with a UE is omitted and cost is lowered. Next, the small cell establishes a data bearer with the UE to share data traffic with the macro base station, so that bandwidth and capacity of mobile broadband communications are increased.

Figure 19:
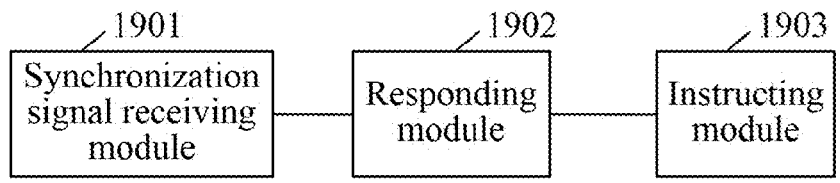
FIG. 19 is a structural diagram of another small cell for wireless broadband communication according to an embodiment of the present invention.

FIG. 19 is a structural diagram of another small cell for wireless broadband communication according to an embodiment of the present invention. This embodiment includes:

A synchronization signal receiving module 1901 is adapted to receive a synchronization signal Preamble sent in a first message by a UE in an idle state, where the small cell determines that the Preamble is a dedicated Preamble; and/or a display indication receiving module is adapted to receive a display indication using a simplified RRC procedure.

A response module 1902 is adapted to respond in a second message indication information about that a first signaling radio bearer SRB 1 and/or second signaling radio bearer SRB 2 does not need to be reestablished or modified.

An instruction module 1903 is adapted to instruct the UE to access a network through the small cell.

The small cell in the embodiment of the present invention may further include:

A user plane data receiving module 1904 is adapted to receive user plane data of the UE.

A user plane data sending module 1905 is adapted to send the user plane data of the UE to a macro base station, so that the macro base station forwards the user plane data of the UE to a core network element, or adapted to send the user plane data of the UE to a core network element.

The small cell in the embodiment of the present invention may further include a measurement control information forwarding module 1906 is adapted to receive measurement control information sent by the macro base station and forward the measurement control information to the UE.

A measurement report forwarding module 1907 is adapted to receive a measurement report fed back by the UE and forward the measurement report the macro base station.

A handover instruction receiving module 1908 is adapted to receive a handover instruction sent by the macro base station if the macro base station judges that handover is required.

The small cell in the embodiment of the present invention may include a random one of the following: a picocell Pico, a femtocell Femto, a low mobility cell LoMo, and a local wireless access point AP.

In the small cell provided in the embodiment of the present invention, it is learned whether a UE needs to reestablish or modify an SRB 1 and/or SRB 2 through determining a Preamble sent by a UE, if it is determined not, it is directly responded that the SRB 1 and/or SRB 2 does not need to be reestablished or modified, and the UE is instructed to access a network, so that the procedure of establishing an SRB 1 and/or SRB 2 is omitted and cost is lowered. The UE then accesses a network through the small cell to share data traffic with the macro base station, so that bandwidth and capacity of mobile broadband communications are increased.

Figure 20:
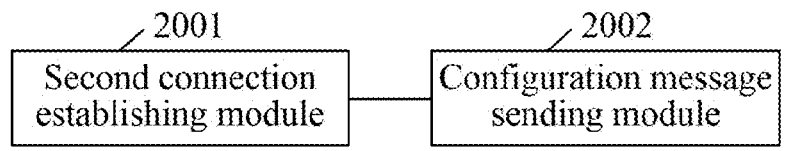
FIG. 20 is a structural diagram of a macro base station for wireless broadband communication according to an embodiment of the present invention.

FIG. 20 is a structural diagram of a macro base station for wireless broadband communication according to an embodiment of the present invention. This embodiment includes the following.

A second connection establishment module 2001 is adapted to establish a Radio Resource Control RRC connection with a UE.

A configuration message sending module 2002 is adapted to send an RRC reconfiguration message to the UE through a wireless interface after the second connection establishment module has established the RRC connection, and send a configuration message to a small cell through a wired or wireless interface, so that the small cell establishes a user plane connection with the UE.

Figure 25:
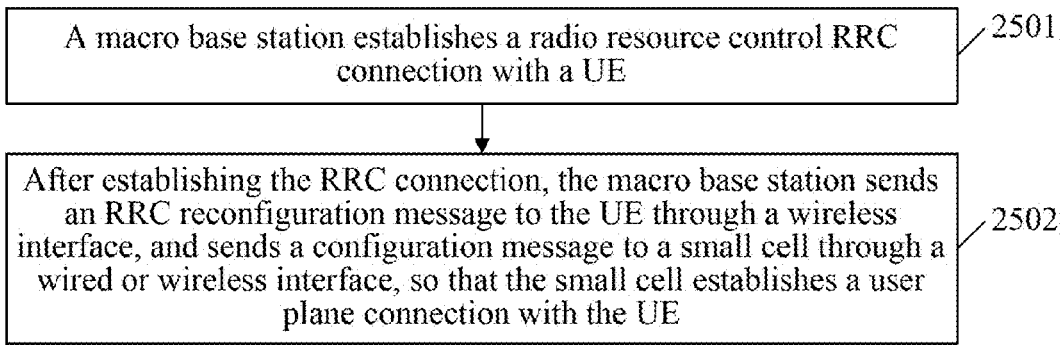
FIG. 25 is a flow chart of another wireless broadband communication method according to an embodiment of the present invention.

The macro base station in the embodiment of the present invention can be adapted to execute the method in the corresponding embodiment shown in FIG. 25.

In the macro base station in the embodiment of the present invention, the configuration message sending module may be adapted to:

send an RRC reconfiguration message to the UE through a wireless interface after the second connection establishment module has established the RRC connection, and send user plane protocol configuration information through a wired or wireless interface, so that the small cell establishes the user plane connection with the UE; or send an RRC reconfiguration message to the UE through a wireless interface through a wired or wireless interface after the second connection establishment module has established the RRC connection, and send secondary component carrier SCC configuration information, so that the small cell establishes the user plane connection with the UE.

In the macro base station in the embodiment of the present invention, the wired interface may include a random one of or a random combination of several of the following: an S1 interface between a base station and a mobility management entity MME, an X2 interface between base stations, a common public radio interface CPRI, and an Iub interface between a wireless network controller and a base station.

In the macro base station in the embodiment of the present invention, the wireless interface may include a Uu interface between a base station and a UE and/or a microwave interface for base station transmission.

In the macro base station in the embodiment of the present invention, the configuration message sending module may be further adapted to send allocation information of a static or semi-static configuration resource after the second connection establishment module has established the RRC connection; and send resource allocation information for random access on the static or semi-static configuration resource or resource allocation information for random access and data scheduling after the second connection establishment module has established the RRC connection.

The macro base station in the embodiment of the present invention may further include an application receiving module 2003, adapted to receive an application for a static or semi-static configuration resource from the small cell; or a handover instruction receiving module 2004, adapted to receive an instruction of handing over the UE to the macro base station.

Compared with the prior art, the macro base station provided in the embodiment of the present invention can establish an RRC connection between a UE and a picocell and then configure a small cell, so that the picocell establishes a data bearer with the UE, and the picocell shares the data traffic of the macro base station; therefore, bandwidth and capacity of mobile broadband communications are increased, and the overall cost of the system is low.

Figure 21:
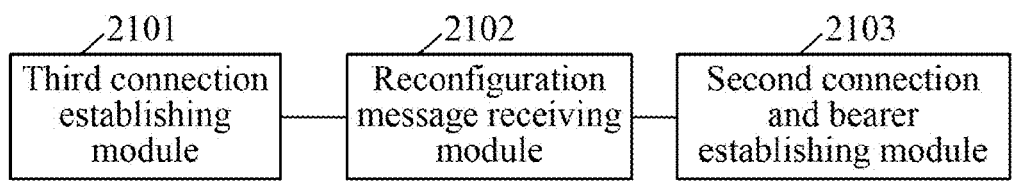
FIG. 21 is a structural diagram of a UE according to an embodiment of the present invention.

FIG. 21 is a structural diagram of a UE according to an embodiment of the present invention. This embodiment includes a number of modules.

A third connection establishment module 2101 is adapted to establish a Radio Resource Control RRC connection with a macro base station.

A reconfiguration message receiving module 2102 is adapted to receive an RRC reconfiguration message sent by the macro base station to the UE after the third connection establishment module has established the RRC connection.

A second connection and bearer establishment module 2103 is adapted to establish a user plane connection with the small cell based on the RRC reconfiguration message received by the reconfiguration message receiving module, and establish a data bearer with the small cell on the user plane connection.

Figure 26:
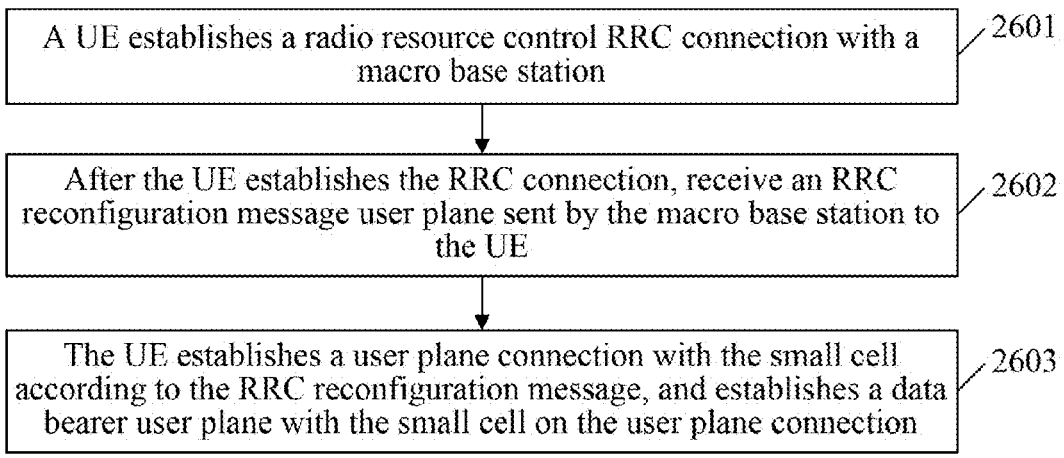
FIG. 26 is a flow chart of another wireless broadband communication method according to an embodiment of the present invention.

The UE in the embodiment of the present invention can be adapted to execute the method in the corresponding embodiment shown in FIG. 26.

In the user equipment in the embodiment of the present invention, a protocol stack of an air interface between the small cell and the UE, only includes the Packet Data Convergence Protocol PDCP, Radio Link Control RLC layer protocol, Media Access Control MAC layer protocol, and Layer 1 L1 protocol; and/or does not include the Radio Resource Control RRC layer protocol.

Compared with the prior art, the UE provided in the embodiment of the present invention can establish an RRC connection with a picocell through a macro base station, and establish a user plane connection with through the picocell RRC reconfiguration, so that the picocell shares data traffic of the macro base station; therefore, bandwidth and capacity of mobile broadband communications are increased, and the overall cost of the system is low.

Figure 22:
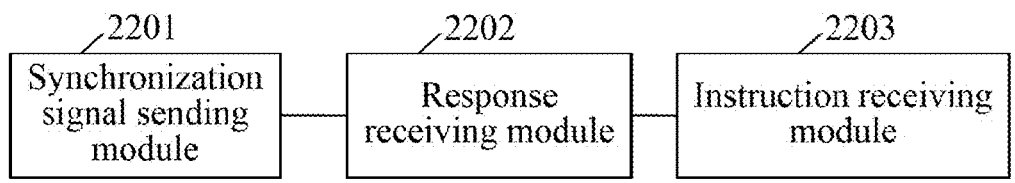
FIG. 22 is a structural diagram of another UE according to an embodiment of the present invention.

FIG. 22 is a structural diagram of another UE according to an embodiment of the present invention. This embodiment includes the following modules.

A synchronization signal sending module 2201 is adapted to send a synchronization signal Preamble in a first message in an idle state, and/or a display indication sending module is adapted to send a display indication using a simplified RRC procedure.

A response receiving module 2202 is adapted to receive indication information about that the first signaling radio bearer SRB 1 and/or second signaling radio bearer SRB 2 does not need to be reestablished or modified in the second message.

An instruction receiving module 2203 is adapted to receive an instruction that the UE accesses a network.

The UE provided in the embodiment of the present invention enables, through sending a Preamble, the small cell to learn whether a UE needs to reestablish or modify an SRB 1 and/or SRB 2, if it is determined not, receive a response that the SRB 1 and/or SRB 2 does not need to be reestablished or modified and an instruction for the UE to access a network, so that the procedure of establishing an SRB 1 and/or SRB 2 is omitted and cost is lowered. The UE then accesses the network through the small cell to share data traffic with the macro base station, so that bandwidth and capacity of mobile broadband communications are increased.

Figure 23:
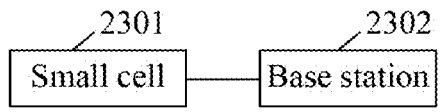
FIG. 23 is a structural diagram of a wireless broadband communication system according to an embodiment of the present invention.

FIG. 23 is a structural diagram of a wireless broadband communication system according to an embodiment of the present invention. This embodiment includes the following.

A small cell 2301 is adapted to: establish a Radio Resource Control RRC connection with a user equipment UE through a macro base station; receive a configuration message sent, through a wired or wireless interface, by a macro base station after the first connection establishment module has established the RRC connection; and establish a user plane connection between the small cell and a UE based on the RRC connection and the configuration message received by the configuration message receiving module, and establish a data bearer with the UE on the user plane connection.

A base station 2302 is adapted to establish a Radio Resource Control RRC connection with a UE; send an RRC reconfiguration message to the UE through a wireless interface after a second connection establishment module has established the RRC connection, and send a configuration message to a small cell through a wired or wireless interface, so that the small cell establishes a user plane connection with the UE.

The small cell in the embodiment of the present invention may be the small cell described in the corresponding embodiment in FIG. 18. The macro base station in the embodiment of the present invention can be the macro base station described in the corresponding embodiment in FIG. 20. The UE in the embodiment of the present invention can be the UE described in the corresponding embodiment in FIG. 21.

Compared with the prior art, in the system provided in the embodiment of the present invention, a small cell may establish a Radio Resource Control RRC connection with a user equipment UE through a macro base station, and the macro base station then configures the small cell, so that the procedure of establishing an RRC connection with a UE is omitted and cost is lowered. Next, the small cell establishes a data bearer with the UE to share data traffic with the macro base station, so that bandwidth and capacity of mobile broadband communications are increased.

Figure 24:
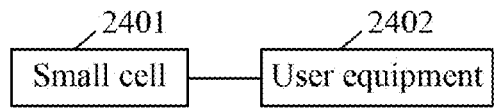
FIG. 24 is a structural diagram of another wireless broadband communication system according to an embodiment of the present invention.

FIG. 24 is a structural diagram of another wireless broadband communication system according to an embodiment of the present invention. This embodiment includes:

A small cell 2401 is adapted to receive a synchronization signal Preamble sent in a first message by a UE in an idle state, where the small cell determines that the Preamble is a dedicated Preamble; and/or a display indication receiving module is adapted to receive a display indication using a simplified RRC procedure; respond in a second message indication information about that a first signaling radio bearer SRB 1 and/or second signaling radio bearer SRB 2 does not need to be reestablished or modified; and instruct the UE to access a network through the small cell.

A user equipment 2402 is adapted to send a synchronization signal Preamble in a first message in an idle state, and/or a display indication sending module is adapted to send a display indication using a simplified RRC procedure; receive indication information about that the first signaling radio bearer SRB 1 and/or second signaling radio bearer SRB 2 does not need to be reestablished or modified in a second message; and receive an instruction that the UE accesses a network through the small cell.

In the system provided in the embodiment of the present invention, a small cell learns whether a UE needs to reestablish or modify an SRB 1 and/or SRB 2 through determining a Preamble sent by a UE, if it is determined not, directly responds that the SRB 1 and/or SRB 2 does not need to be reestablished or modified, and instructs the UE to access a network, so that the procedure of establishing an SRB 1 and/or SRB 2 is omitted and cost is lowered. The UE then accesses a network through the small cell to share data traffic with the macro base station, so that bandwidth and capacity of mobile broadband communications are increased.

FIG. 25 is a flow chart of another wireless broadband communication method according to an embodiment of the present invention. This embodiment includes:

Step 2501. A macro base station establishes a Radio Resource Control RRC connection with a UE.

Step 2502. The macro base station sends an RRC reconfiguration message to the UE through a wireless interface after establishing the RRC connection, and sends a configuration message to a small cell through a wired or wireless interface, so that the small cell establishes a user plane connection with the UE.

In the method in the embodiment of the present invention, that a macro base station sends an RRC reconfiguration message to a UE through a wireless interface after establishing an RRC connection, and sends a configuration message to a small cell through a wired or wireless interface, so that the small cell establishes a user plane connection with the UE may include sending the RRC reconfiguration message to the UE through a wireless interface after the RRC connection has been established, and sending user plane protocol configuration information through a wired or wireless interface, so that the small cell establishes the user plane connection with the UE; or sending the RRC reconfiguration message to the UE through a wireless interface after the RRC connection has been established, and sending secondary component carrier SCC configuration information through a wired or wireless interface, so that the small cell establishes the user plane connection with the UE.

In the method in the embodiment of the present invention, the wired interface may include a random one of or a random combination of several of the following: an S1 interface between a base station and a mobility management entity MME, an X2 interface between base stations, a common public radio interface CPRI, and an Iub interface between a wireless network controller and a base station.

The wireless interface may include Uu interface between a base station and a UE and/or a microwave interface for base station transmission.

In the macro base station in the embodiment of the present invention, the configuration message sending module may be further adapted to send allocation information of a static or semi-static configuration resource; and send resource allocation information for random access on the static or semi-static configuration resource or resource allocation information for random access and data scheduling.

The method in the embodiment of the present invention may further include the following steps.

Step 2503. Receive an application for a static or semi-static configuration resource from the small cell; or receive an instruction of handing over the UE to the macro base station.

Compared with the prior art, in the method provided in the embodiment of the present invention, a macro base station can establish an RRC connection between a UE and a picocell, and then configures a small cell, so that the picocell establishes a data bearer with the UE, and the picocell shares data traffic with the macro base station; therefore, bandwidth and capacity of mobile broadband communications are increased, and overall cost of the system is low.

FIG. 26 is a flow chart of another wireless broadband communication method according to an embodiment of the present invention. This embodiment includes the following steps.

Step 2601. A UE establishes a Radio Resource Control RRC connection with a macro base station.

Step 2602. Receive an RRC reconfiguration message sent by the macro base station to the UE after the UE has established the RRC connection.

Step 2603. The UE establishes a user plane connection with the small cell based on the RRC reconfiguration message, and establishes a data bearer with the small cell on the user plane connection.

In the method in the embodiment of the present invention, a protocol stack of an air interface between the small cell and the UE only includes the Packet Data Convergence Protocol PDCP, Radio Link Control RLC layer protocol, Media Access Control MAC layer protocol, and Layer 1 L1 protocol; and/or does not include the Radio Resource Control RRC layer protocol.

Compared with the prior art, in the method provided in the embodiment of the present invention, the UE can establish an RRC connection with a picocell through a macro base station, and then establish a user plane connection with the picocell through RRC reconfiguration, so that the picocell shares data traffic with the macro base station, bandwidth and capacity of mobile broadband communications are increased, and overall cost of the system is low.

Through the above description of the implementation, it is clear to persons skilled in the art that the present invention may be accomplished through hardware, or through software plus a necessary universal hardware platform. Based on this, the technical solutions of the present invention may be embodied in the form of a software product. The software product may be stored in one nonvolatile storage medium (for example, CD-ROM, USB flash drive, or removable hard disk) and contain several instructions adapted to instruct computer equipment (for example, a personal computer, a server, or network equipment) to perform the method according to the embodiments of the present invention.

It should be understood by persons skilled in the art that the accompanying drawings are merely schematic diagrams of a preferred embodiment, and modules or processes in the accompanying drawings are not necessarily required in implementing the present invention.

It should be understood by persons skilled in the art that, modules in a device according to an embodiment may be distributed in the device of the embodiment according to the description of the embodiment, or be correspondingly changed to be disposed in one or more devices different from this embodiment. The modules of the above embodiment may be combined into one module, or further divided into a plurality of sub-modules.

The sequence numbers in the embodiments of the present invention are for description only and do not represent preferences for embodiments.

The above descriptions are merely specific embodiments of the present invention, but not intended to limit the present invention. Any modification, equivalent replacement, or improvement made by persons skilled in the art that should fall within the protection scope of the present invention.

What is claimed is:

1. A user equipment comprising:
    a transmitter;
    a processor, adapted to establish a Radio Resource Control (RRC) connection with a macro base station; and
    a receiver, adapted to receive an RRC reconfiguration message sent by the macro base station to a user equipment (UE) after the processor has established the RRC connection;
    wherein the processor is further adapted to establish a user plane connection with a small cell through an air interface based on the received RRC reconfiguration message, and establish a data bearer with the small cell on the user plane connection, wherein the data bearer only transmits user plane data between the UE and a core network (CN) element; and
    wherein the transmitter is adapted to:
        transmit only control plane signaling through the established RRC connection to the macro base station; and
        transmit the user plane data only via the data bearer to the small cell for sending the user plane data through the macro base station to the CN element, or transmit user plane data only via the data bearer to the small cell for sending the user plane data to the CN element.

2. The user equipment according to claim 1, wherein a protocol stack of the air interface between the small cell and the UE, only comprises Packet Data Convergence Protocol (PDCP), Radio Link Control (RLC) layer protocol, Media Access Control (MAC) layer protocol, and Layer 1 L1 protocol, and/or does not comprise RRC layer protocol.

3. The user equipment according to claim 1, wherein at the same time of establishing the data bearer on the user plane connection, the user equipment keeps the RRC connection with the macro base station, and performs transmission of control plane data with the macro base station on the RRC connection.

4. A wireless broadband communication method comprising:
    establishing, by a user equipment (UE), a Radio Resource Control (RRC) connection with a macro base station;
    receiving an RRC reconfiguration message sent by the macro base station to the UE after the UE has established the RRC connection;
    establishing, by the UE, a user plane connection with a small cell through an air interface based on the RRC reconfiguration message; and
    establishing a data bearer with the small cell on the user plane connection, wherein the data bearer is only used to transmit user plane data between the UE and a core network (CN) element;
    transmitting control plane signaling through the established RRC connection to the macro base station, wherein all control plane signaling between the UE and the macro base station is transmitted through the established RRC connection to the macro base station; and
    transmitting the user plane data using the data bearer to the small cell for sending the user plane data through the macro base station to the CN element, or transmitting the user plane data using the data bearer to the small cell for sending the user plane data to the CN element, wherein all user plane data between the UE and the CN element is transmitted using the data bearer.

5. The method according to claim 4, wherein a protocol stack of the air interface between the small cell and the UE, only comprises Packet Data Convergence Protocol (PDCP), Radio Link Control (RLC) layer protocol, Media Access Control (MAC) layer protocol, and Layer 1 L1 protocol, and/or does not comprise RRC layer protocol.

6. The method according to claim 4, wherein at the same time of establishing the data bearer on the user plane connection, the UE keeps the RRC connection with the macro base station, and performs transmission of control plane data with the macro base station on the RRC connection.

7. A macro base station comprising:
    a processor, configured to:
        establish a Radio Resource Control (RRC) connection with a UE;
        send an RRC reconfiguration message to the UE through a wireless interface after the RRC connection is established; and
        send a configuration message to a small cell through a wired or wireless interface, wherein the RRC reconfiguration message and the configuration message are used for the small cell and the UE to establish a user plane connection;

wherein a data bearer is established between the small cell and the UE on the user plane connection, wherein the data bearer is configured to only transmit user plane data between the UE and a core network (CN) element; and wherein the RRC connection is configured to transmit only control plane signaling.

8. The macro base station according to claim 7, wherein the processor is further configured to send the RRC reconfiguration message to the UE through a wireless interface after the RRC connection is established, and send user plane protocol configuration information through a wired or wireless interface, wherein the RRC reconfiguration message and the configuration message are used for the small cell and the UE to establish the user plane connection.

9. The macro base station according to claim 7, wherein the processor is configured to send the RRC reconfiguration message to the UE through a wireless interface after the the RRC connection is established, and send secondary component carrier SCC configuration information through a wired or wireless interface, wherein the RRC reconfiguration message and the configuration message are used for the small cell and the UE to establish the user plane connection.

10. The macro base station according to claim 7, wherein the wired interface comprises a random one of or a random combination of several of the following:

an S1 interface between a base station and a mobility management entity MME, an X2 interface between base stations, a common public radio interface CPRI, and an Iub interface between a wireless network controller and a base station; and the wireless interface comprises a Uu interface between a base station and a UE and/or a microwave interface for base station transmission.

11. The macro base station according to claim 7, wherein the processor is further configured to:

send allocation information of a static or semi-static configuration resource the RRC connection is established; and send resource allocation information for random access on the static or semi-static configuration resource or resource allocation information for random access and data scheduling after the RRC connection is established.

12. The macro base station according to claim 10, wherein the processor is further configured to receive an application for a static or semi-static configuration resource from the small cell.

13. The macro base station according to claim 10, wherein the processor is further configured to receive an instruction of handing over the UE to the macro base station.

\* \* \* \* \*